United States Patent
Spainhower

(10) Patent No.: US 7,540,528 B2
(45) Date of Patent: Jun. 2, 2009

(54) FOLDING TRAILER

(75) Inventor: Paul Spainhower, Taylorsville, UT (US)

(73) Assignee: Pals Manufacturing LLC, Taylorsville, UT (US)

( * ) Notice: Subject to any disclaimer, the term of this patent is extended or adjusted under 35 U.S.C. 154(b) by 189 days.

(21) Appl. No.: 11/449,423

(22) Filed: Jun. 7, 2006

(65) Prior Publication Data

US 2006/0279071 A1 Dec. 14, 2006

Related U.S. Application Data

(60) Provisional application No. 60/689,000, filed on Jun. 8, 2005.

(51) Int. Cl.
*B62B 5/00* (2006.01)
(52) U.S. Cl. .................... 280/656; 280/415.1
(58) Field of Classification Search ............... 280/400, 280/401, 656, 639, 402, 415.1; 414/462, 414/482
See application file for complete search history.

(56) References Cited

U.S. PATENT DOCUMENTS

| | | | |
|---|---|---|---|
| 3,979,133 A | 9/1976 | Morris | |
| 4,126,324 A | 11/1978 | Browning | |
| 4,239,258 A | 12/1980 | Burris | |
| 4,362,316 A | 12/1982 | Wright | |
| 4,786,073 A | 11/1988 | Harper | |
| 5,340,145 A | 8/1994 | Leib et al. | |
| 5,354,090 A | 10/1994 | Grovom | |
| 5,544,944 A * | 8/1996 | Keech | 298/5 |
| 5,570,898 A | 11/1996 | Albert | |
| 5,607,176 A | 3/1997 | Leib et al. | |
| 5,924,836 A | 7/1999 | Kelly | |
| 6,113,130 A * | 9/2000 | Saulce | 280/656 |
| 6,254,117 B1 | 7/2001 | Cross | |
| 6,286,854 B1 | 9/2001 | Cross | |
| 6,767,025 B2 | 7/2004 | Hagen | |
| 6,846,003 B2 | 1/2005 | Thompson | |
| 6,955,375 B2 | 10/2005 | Thurm | |
| 7,004,495 B2 * | 2/2006 | Thurm | 280/656 |
| 2001/0026060 A1 | 10/2001 | Cross | |
| 2003/0102655 A1 | 6/2003 | Thompson | |
| 2004/0032114 A1 | 2/2004 | Hagen | |
| 2005/0184485 A1 | 8/2005 | Timmermans | |

FOREIGN PATENT DOCUMENTS

EP 0 025 196 A1 8/1980
GB 2361 460 A 10/2001

* cited by examiner

*Primary Examiner*—Christopher P Ellis
*Assistant Examiner*—Brian Swenson
(74) *Attorney, Agent, or Firm*—Clayton, Howarth & Cannon, P.C.

(57) ABSTRACT

A folding trailer may include a front deck and a rear deck that may be folded together into a compact configuration. The trailer may include a folding mechanism having a support base on opposing sides of the trailer. The support base may include one or more casters for supporting the trailer in a folded configuration and allowing the trailer to be easily moved. The folding mechanism may include a linkage structure which moves the support base into position when the trailer is folded and facilitate folding of the front and rear decks together.

40 Claims, 18 Drawing Sheets

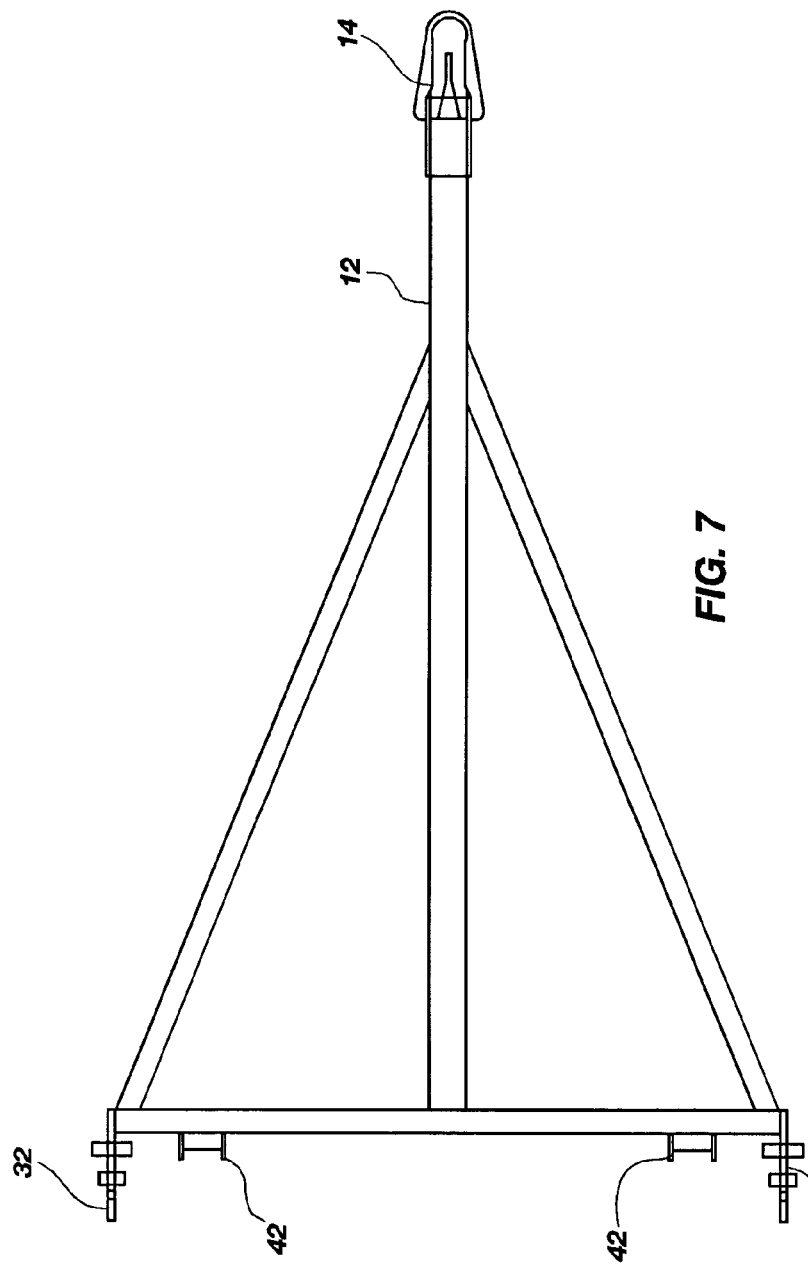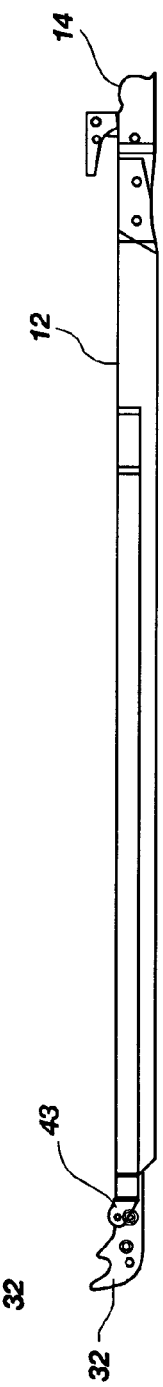
FIG. 7
FIG. 8

FOLDING TRAILER

CROSS-REFERENCE TO RELATED APPLICATIONS

This application claims the benefit of U.S. Provisional Application No. 60/689,000, filed Jun. 8, 2005, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to trailers, and more particularly, but not necessarily entirely, to trailers that are capable of folding to occupy reduced space.

2. Description of Related Art

Trailers are commonly used for towing behind vehicles for carrying assorted items such as motorcycles, water-craft, supplies, or equipment, for example. Trailers are known to provide various advantages, such as creating additional storage space to allow towing vehicles to carry additional items. Trailers may be detached from the towing vehicle such that the towing vehicle may be easier and more efficient to handle when it is not necessary to transport the additional items.

A drawback of trailers has been that the trailers require storage space when not in use. Attempts have been made to provide collapsible trailers such that the trailers may occupy less space when not in use. However, the collapsible trailers known in the art may be difficult to operate, often requiring the assistance of multiple people to place the trailer in a folded position. Other collapsible trailers may be difficult to move or position as desired once the trailers are in a folded configuration.

Despite the advantages of known collapsible trailers, improvements are still being sought. The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 7 is a top view of one embodiment of a trailer tongue;

FIG. 8 is a side view of the trailer tongue of FIG. 7;

DETAILED DESCRIPTION

Figure 1:
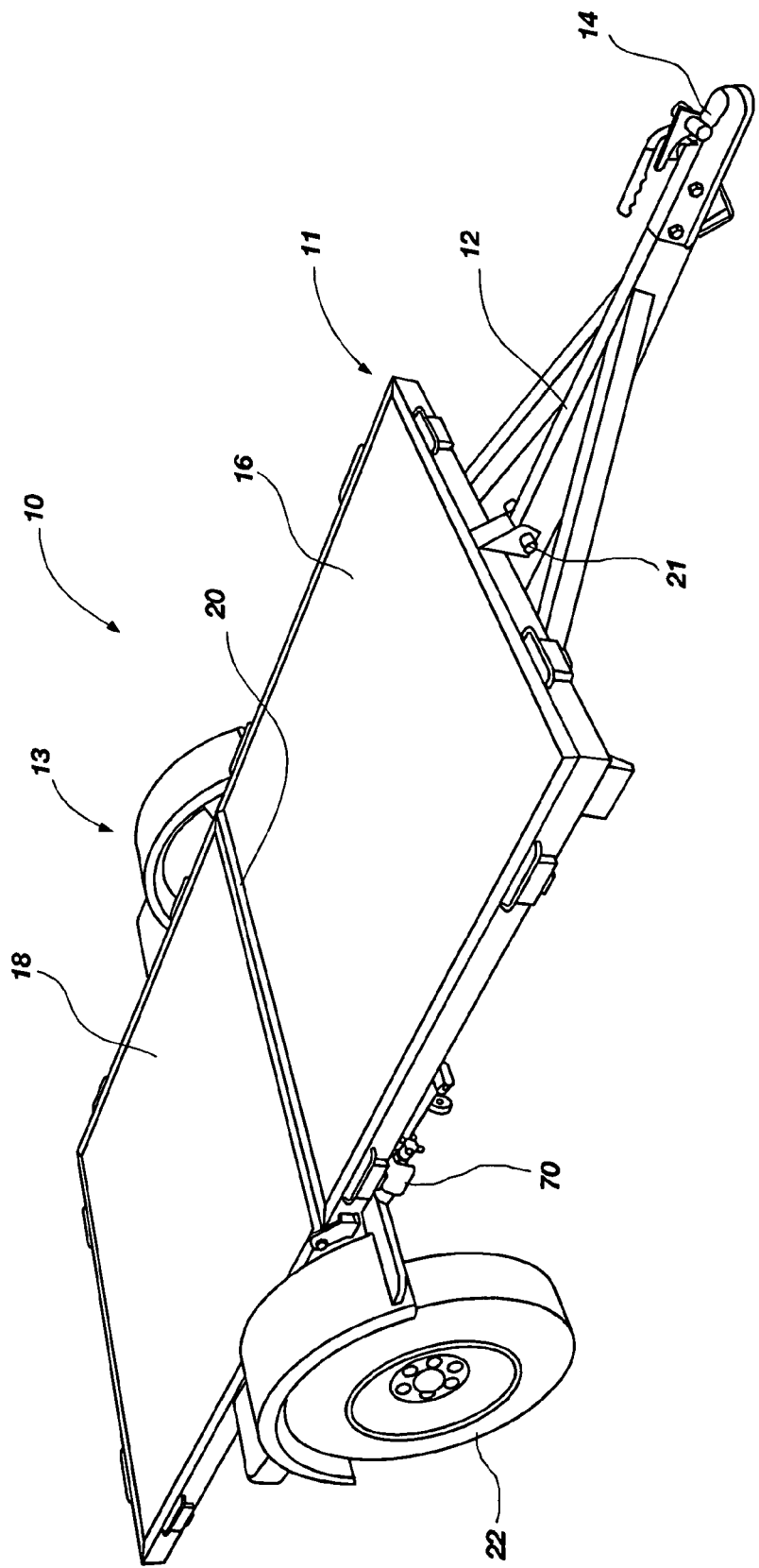
FIG. 1 is a perspective view of one embodiment of a folding trailer in accordance with the principles of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present features relating to the present folding trailer are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

Referring now to FIG. 1, a perspective view of a folding trailer is shown, indicated generally at 10. It will be understood that the trailer 10 may be formed in various different sizes and configurations within the scope of the present disclosure. For example, the trailer 10 may be formed with a flat bed without side walls, or the trailer 10 may have side walls or other such supports that may be removably attached for assisting in protecting or containing items to be transported. The trailer 10 may be sized and configured for receiving any of a variety of items, such as recreational vehicles, water craft, or any type of cargo. Moreover, the trailer 10 may be configured to be towed by any type of tow vehicle (not shown) known in the art.

Figure 2:
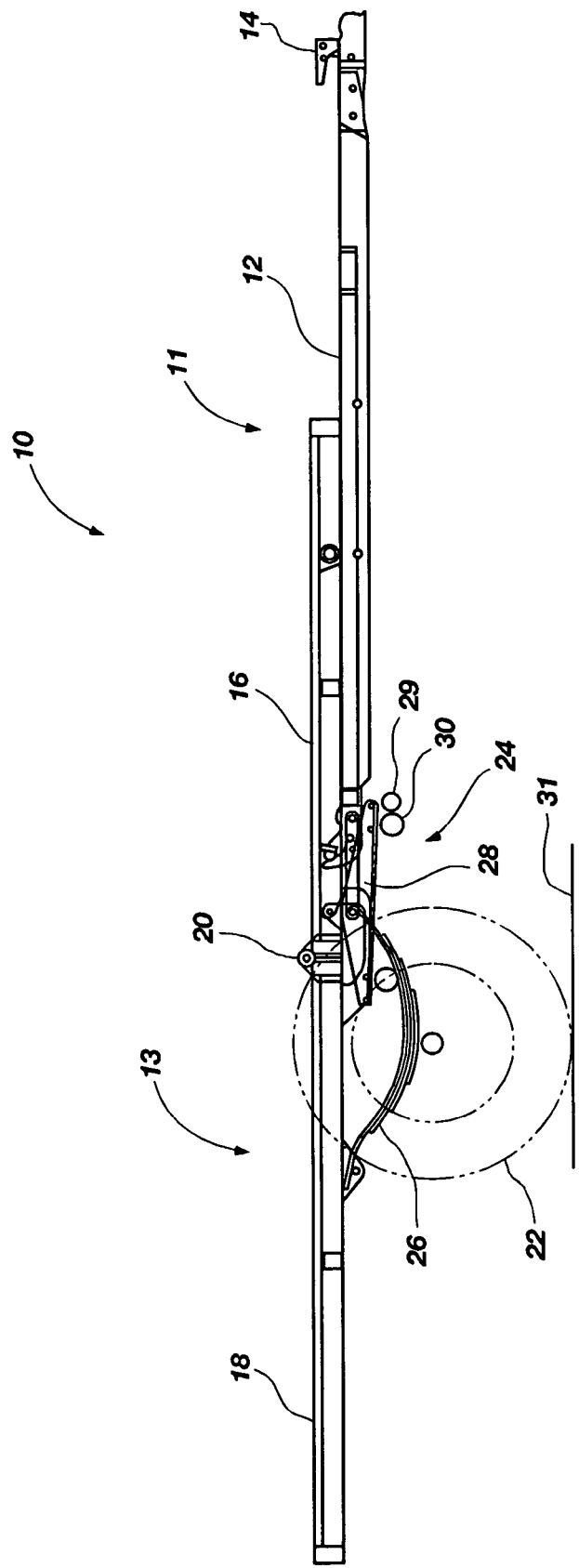
FIG. 2 is a side view of one embodiment of a folding trailer.
Figure 5:
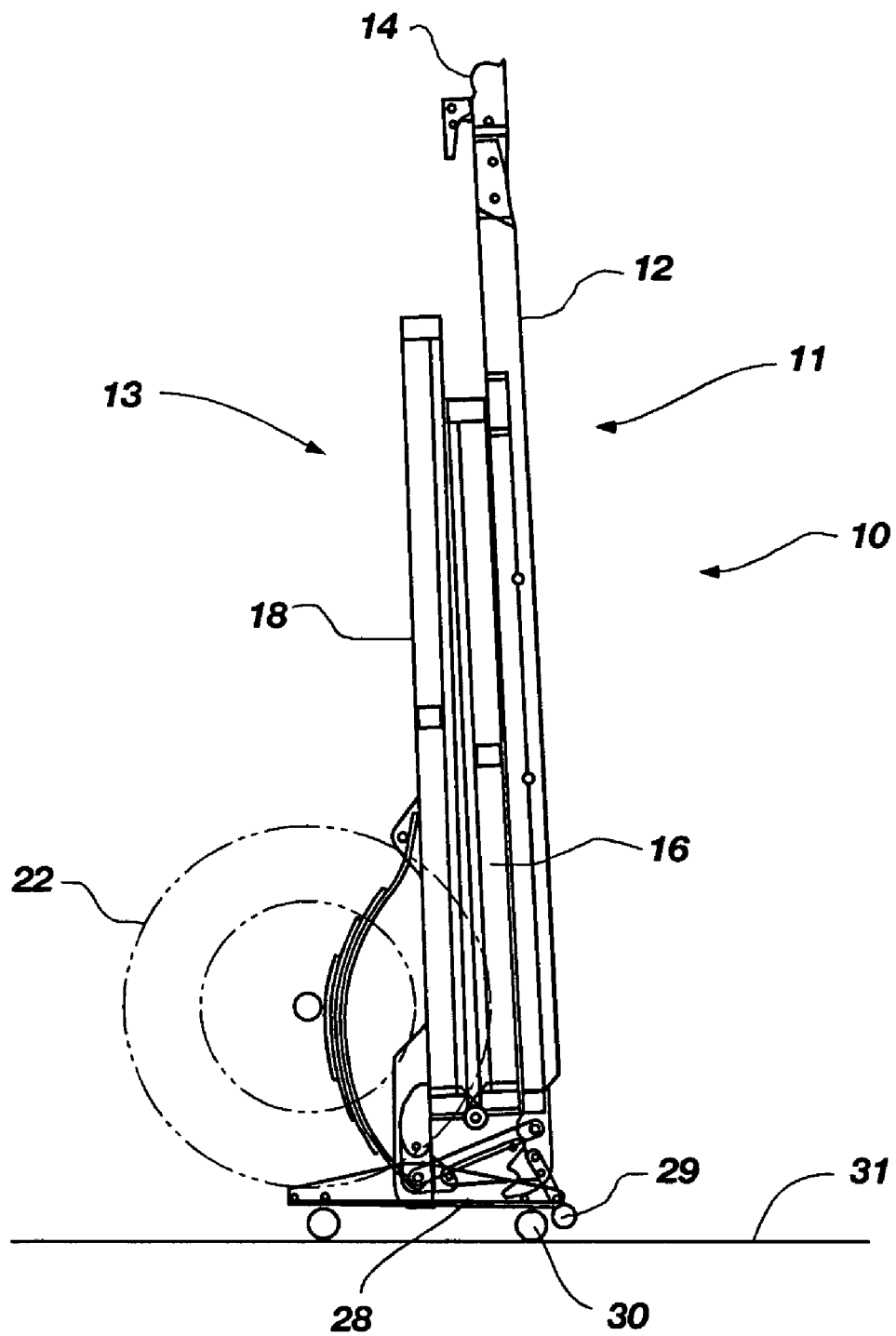
FIG. 5 is a side view of the folding trailer of FIG. 2 in a folded position.

The trailer 10 may include a front portion, indicated generally at 11, and a rear portion, indicated generally at 13. The front portion 11 may include a tongue or tongue portion 12 having a connection mechanism 14 or hitch as is known in the art for attaching the trailer 10 to a tow vehicle. The front portion 11 may also include a front deck 16 and the rear portion 13 may include a rear deck 18. The front deck 16 and the rear deck 18 may be rotatably joined together at a joint 20 using any of a variety of hinge mechanisms. Accordingly, the front portion 11 and the rear portion 13 may be folded together from an open position as shown in FIGS. 1-2 to a folded position as shown in FIG. 5. It will also be understood that the principles of the present disclosure may be utilized with folding occurring in other directions with respect to the trailer in alternative embodiments, such as side to side or diagonal folding, and that the trailer need not necessarily fold in half. Rather, the trailer may fold in more than one location, or one folded portion of the trailer may be larger than another.

A securing member 21 may be provided to hold the front deck 16 in position with respect to the tongue 12. One embodiment of the securing member 21 may include a receiver 25 fixed to the front deck 16, as shown most clearly in FIG. 6. The receiver 25 may have openings corresponding to an opening formed in the tongue 12. The openings in the receiver 25 may be aligned with the opening in the tongue 12 and a pin or bolt 27 may be inserted in the openings in the receiver and tongue 12 to prevent movement of the front deck 16 with respect to the tongue 12. It will be understood that the securing member 21 may be positioned at any suitable location. Moreover, it will be understood that any other suitable securing mechanism known to those skilled in the art may be used, or in some cases, no securing member may be provided.

Figure 6:
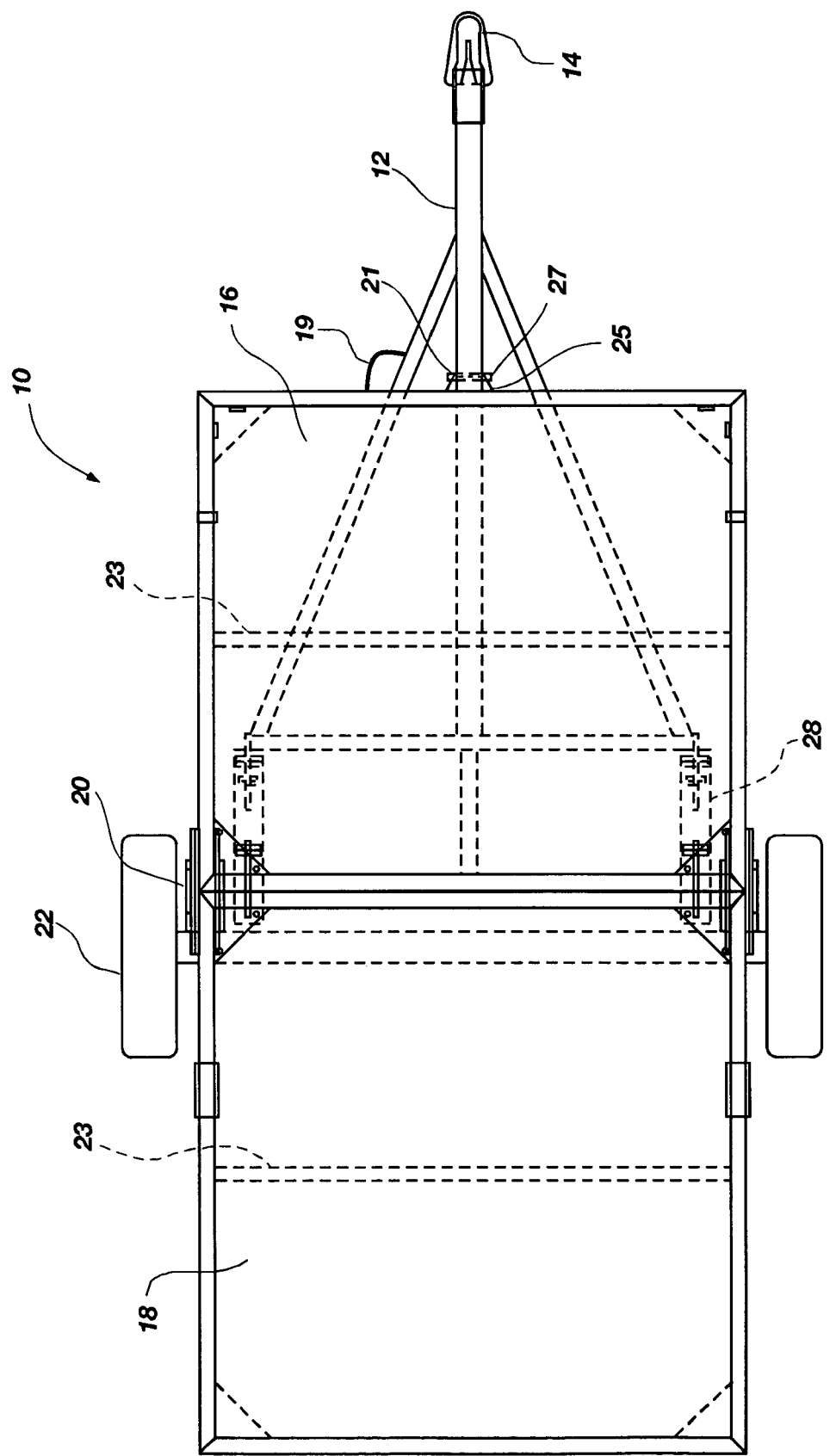
FIG. 6 is a top view of one embodiment of a folding trailer.

A flexible connector 19, as shown in FIG. 6, in the form of a cable, chain, or any variety of cord, may also be attached to the front deck 16 and the tongue 12, to limit the amount of movement of the front deck 16 with respect to the tongue 12. Accordingly, the front deck 16 may be joined to the tongue 12, even when the securing member 21 is released, to allow limited movement of the front deck 16 with respect to the tongue 12. The length of the flexible connector 19 may vary depending on the amount of movement desired to allow between the front deck 16 and the tongue 12, and the location of the flexible connector 19 may also vary as desired. Moreover, some embodiments of the trailer 10 may be formed without the flexible connector 19.

The front deck 16 and the rear deck 18 may include a continuous or discontinuous flooring for supporting objects thereupon. One embodiment of the front deck 16 and the rear deck 18 may include a frame having spaced apart members for supporting objects such as a boat or wheels of a vehicle to be carried, for example. The trailer 10 may also include one or more wheels 22 as are known in the art. One embodiment of the trailer 10 may include the wheels 22 disposed on the rear portion 13 of the trailer 10.

Referring now to FIGS. 2-5, side views of one embodiment of the trailer 10 are shown with the wheels 22 shown in dashed lines to more clearly depict the folding mechanism, indicated generally at 24. Moreover, the folding mechanism 24 is shown schematically in FIGS. 2-5 since portions of the folding mechanism 24 depicted would be hidden as viewed from the side, as depicted more clearly in the enlarged side views of FIGS. 24-26.

Figure 3:
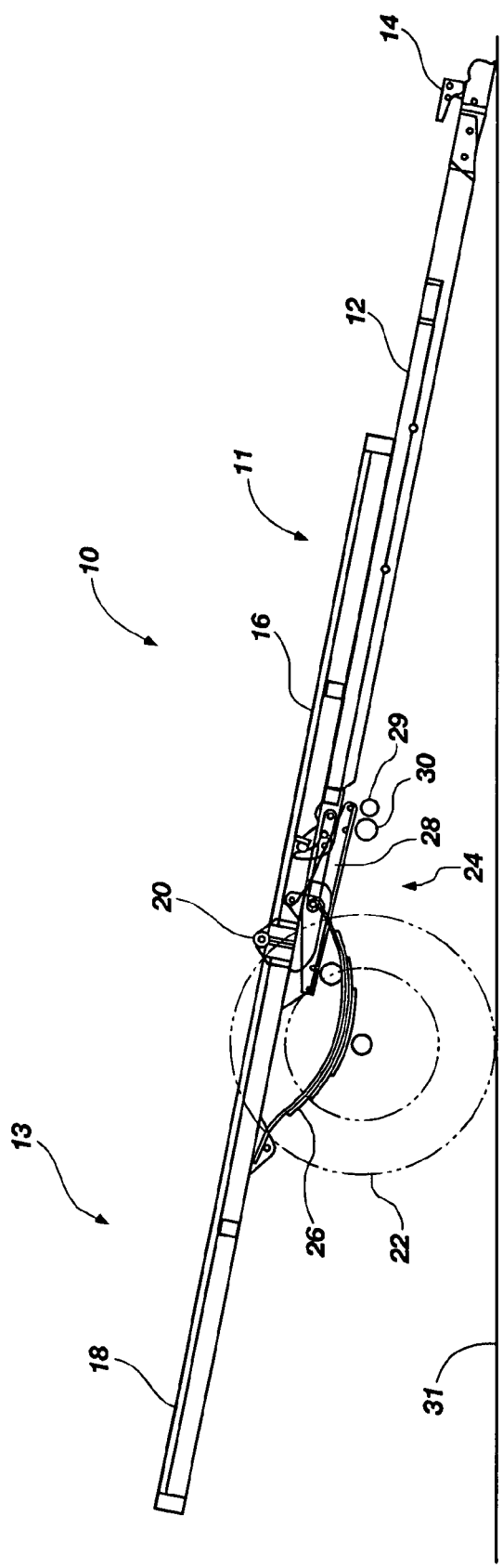
FIG. 3 is a side view of the folding trailer of FIG. 2 with the front in a lowered position.
Figure 4:
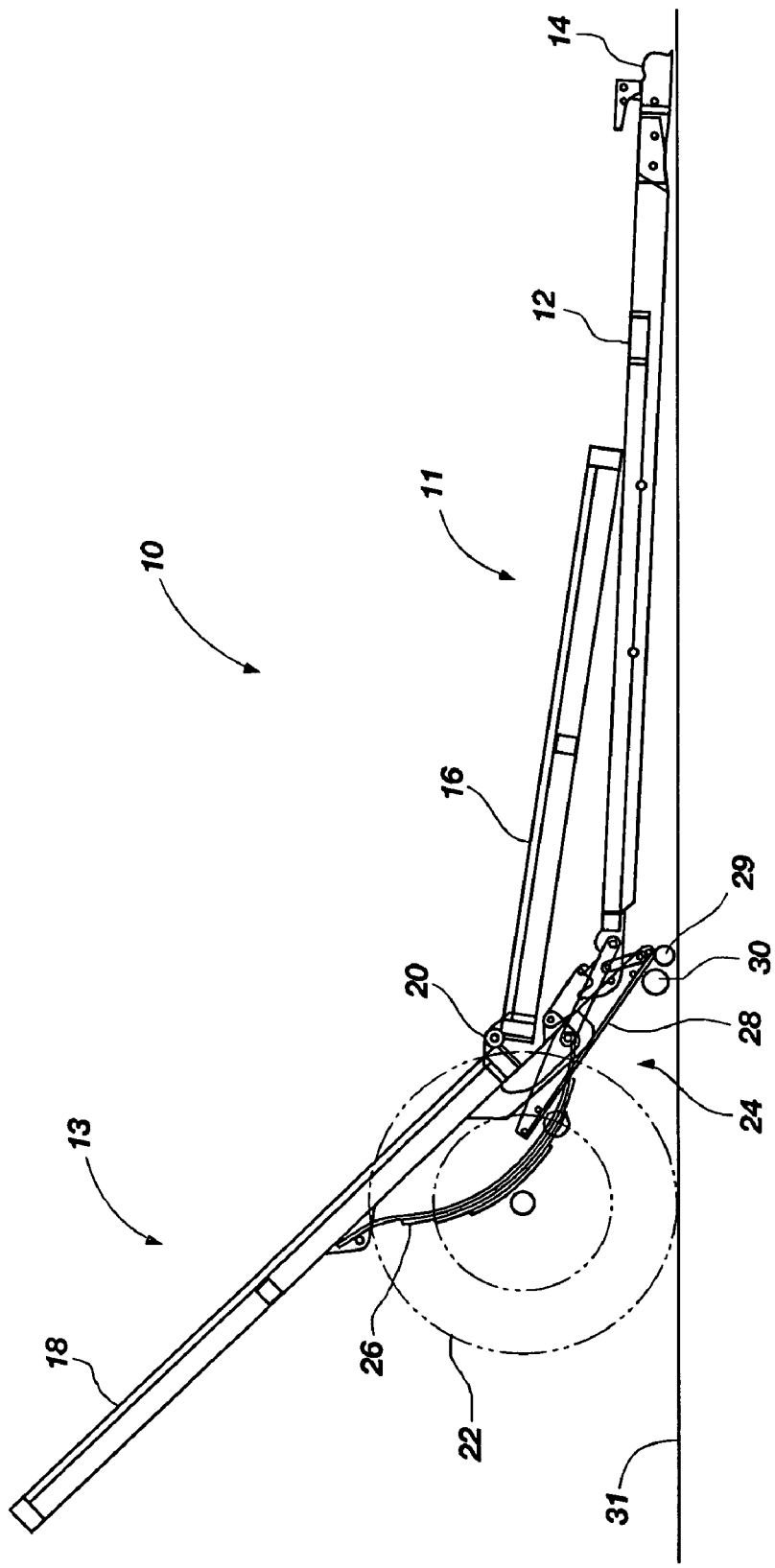
FIG. 4 is a side view of the folding trailer of FIG. 2 in a partially folded position.

A summary of the folding function of the trailer 10 may be described generally with reference to FIGS. 2-5. As shown in FIG. 2, the trailer 10 may be arranged in the open position for being attached to a tow vehicle and for carrying objects. When it is desired to store the trailer 10 in a more compact configuration, the tongue 12 may be lowered as shown in FIG. 3, the front deck 16 may be separated from the tongue 12 such that the trailer 10 may be partially folded as shown in FIG. 4, then the trailer 10 may be moved to the folded position, as shown most clearly in FIG. 5.

The folding mechanism 24 may include one or more support bases 28. One embodiment of the trailer 10 may include two support bases 28 positioned on opposing sides of the trailer 10. The front portion 11 and the rear portion 13 of the trailer 10 may be rotatably joined to the support base 28 to allow movement of the support base 28 with respect to the front portion 11 and rear portion 13 of the trailer 10. The support base 28 may include one or more rollers 30 on a lower side for being positioned on the ground or other support surface 31 for supporting the trailer 10. The rollers 30 may include any variety of wheels or casters known in the art. One embodiment of the present disclosure may include a support base 28 having two rollers 30, one roller 30 positioned on a front portion of the support base 28, and another roller 30 positioned on a rear portion of the support base 28 such that when the trailer 10 is supported by the rollers 30, four rollers (two rollers 30 on each side of the trailer 10) may be in contact with a support surface 31, such as the ground, floor or any variety of pavement, to provide a stable support for the trailer 10.

It will be understood that the rollers 30 may be configured as casters to swivel in a manner known in the art such that the trailer 10 may be easily manipulated when the trailer 10 is supported on the rollers 30. It will also be understood that other arrangement of rollers 30 may be utilized within the scope of the present disclosure. For example, various combinations of wheels and casters may be used to achieve desired support and control capabilities of the support base 28. Moreover, other embodiments of the support base may not include rollers 30 such that the trailer 10 may be more firmly held in position with respect to the support surface 31.

One embodiment of the present disclosure may include a bumper 29, as shown schematically in FIG. 4, positioned near an end of the support base 28. The bumper 29 may be formed of a resilient material in the shape of a wheel or protrusion, for example, or any other suitable configuration. The bumper 29 may be useful in protecting the rollers 30 and support base 28 against damage caused by impact with the support surface 31 as the trailer 10 is being folded.

As clearly shown in FIGS. 2-5, the trailer 10 may include any variety of shock absorbers, such as leaf springs 26. It will be understood that other embodiments of the present disclosure may include shock absorbers of different types, such as coiled springs or gas shock absorbers, for example, or any other type of shock absorber known to those skilled in the art. It will also be understood that other embodiments of the present disclosure may include a trailer 10 without shock absorbers.

Referring to FIG. 6, a top view of one embodiment of the trailer 10 is shown. It will be understood that various different configurations of support structures 23 or braces may be provided to provide strength to the trailer 10. Moreover, it will be understood that one embodiment of the present disclosure may include the tongue 12 positioned beneath the front deck 16 to provide support to the front deck 16. The trailer 10 may be configured such that the tongue 12 may be moveable with respect to the front deck 16 as discussed more fully below.

A discussion of exemplary components of the folding trailer 10 will now follow. Referring to FIG. 7, a top view of one embodiment of the tongue 12 is shown. It will be understood that the tongue 12 may have various different configurations, and that the tongue 12 shown in FIG. 7 is merely one example for illustrative purposes. The hitch 14 may be located on a front of the tongue 12, and a front brace 32 may be located on opposing sides of the back end of the tongue 12. A side view of the tongue 12 and front brace 32 is shown in FIG. 8. Additional discussion of the interrelation of the front brace 32 with other components of the trailer 10 is provided below.

Figure 9:
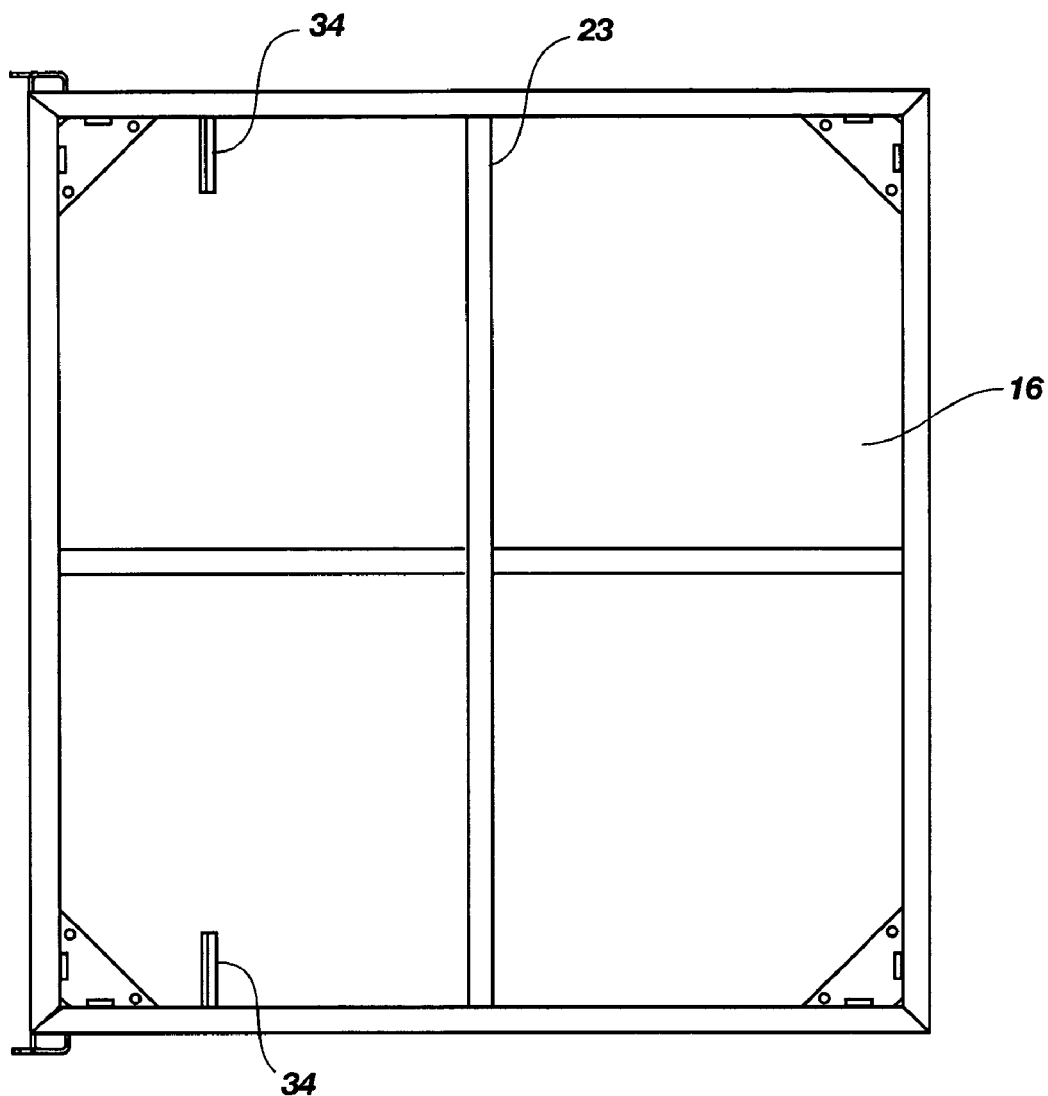
FIG. 9 is a bottom view of one embodiment of a front deck of a folding trailer.
Figure 10:
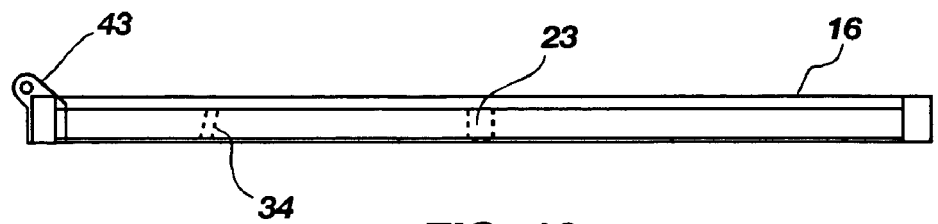
FIG. 10 is a side view of the front deck of FIG. 9.

A bottom view of one embodiment of the front deck 16 is shown in FIG. 9, and a side view of the front deck 16 is shown in FIG. 10. Locking bars 34, also sometimes referred to herein as catches, may be positioned on a bottom of the front deck 16 for holding the front deck 16 in position with the tongue 12. The catches 34 may be formed in various configurations suitable for interacting with the front braces 32 on the tongue 12.

Figure 11:
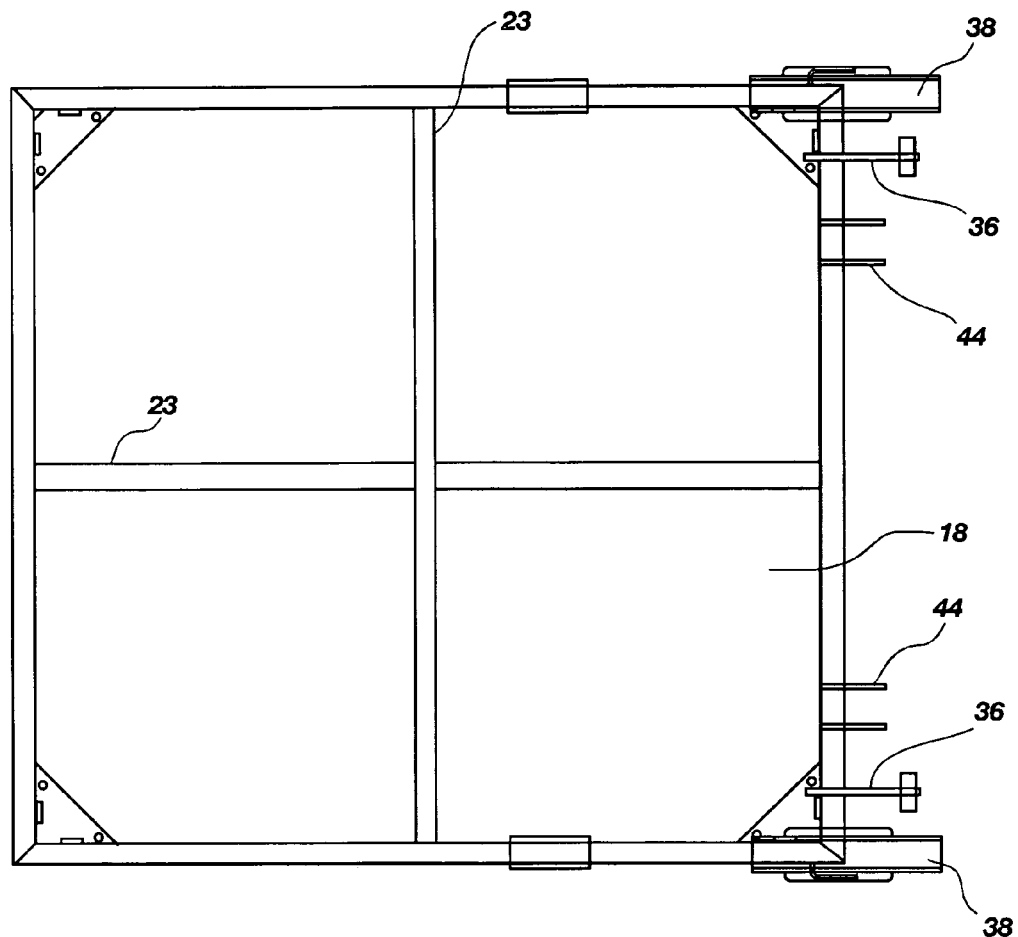
FIG. 11 is a bottom view of one embodiment of a rear deck of a folding trailer.
Figure 12:
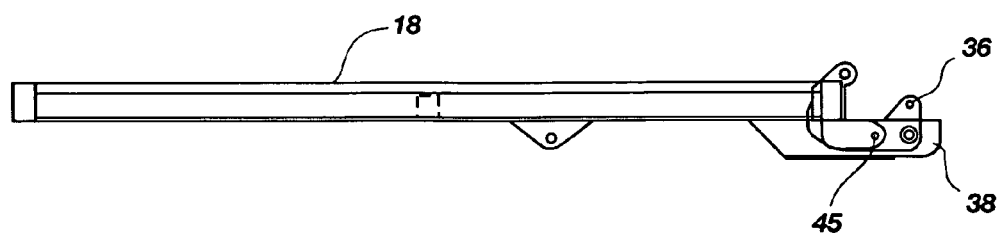
FIG. 12 is a side view of the rear deck of FIG. 11.

A bottom view of one embodiment of the rear deck 18 is shown in FIG. 11, and a side view of the rear deck 18 is shown in FIG. 12. A rear brace 36 may be positioned on a front of the rear deck 18, and a rear deck support 38 may also be provided on opposing sides of the rear deck 18. The rear deck support 38 may be configured to reside under the front deck 16 when the trailer 10 is in an open position to add support for the front deck 16. Also, the rear deck support 38 may provide support for joining the leaf springs 26 with the rear deck 18. The rear brace 36 may be configured to be joined with the front portion 11 of the trailer 10 as part of the folding mechanism 24.

Figure 13:
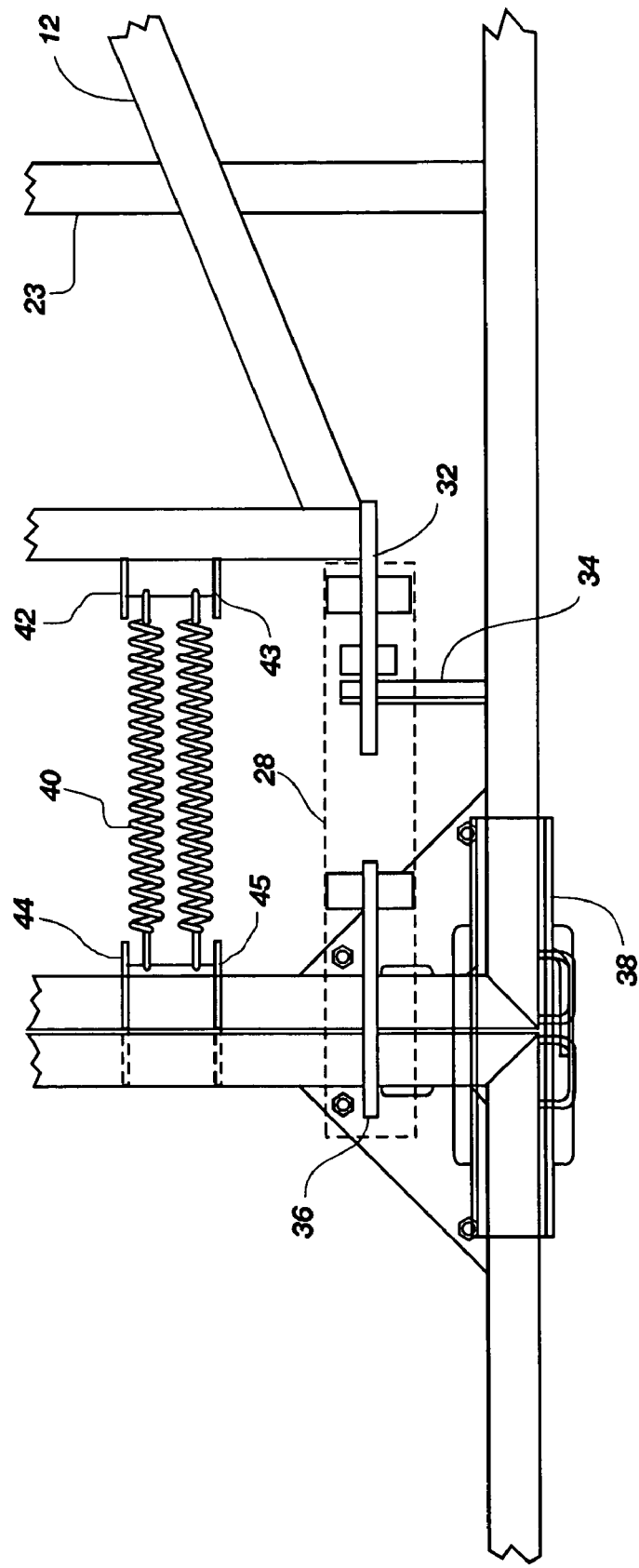
FIG. 13 is a break-away bottom view of one embodiment of a portion of a folding trailer.

Referring to FIG. 13, a break-away bottom view is shown of a portion of the folding trailer 10 of FIG. 2. Springs 40 or other such biasing members may be provided to reduce the force required to fold the trailer 10. It will be understood that two springs 40 are shown and two similar springs may also be provided on the opposite side of the trailer 10. It will also be understood that other quantities of springs 40 may be used within the scope of the present disclosure, and that some embodiments may not include any springs. The springs 40 may be mounted between a front spring bracket 42 mounted on a rear end of the tongue 12, and a rear spring bracket 44 mounted on front end of the rear deck 18. One embodiment of the front spring bracket 42 and the rear spring bracket 44 may include opposing sidewalls having openings 43, 45, respectively, for receiving a shaft or bolt for attaching the springs 40 thereupon. However, it will be understood that the front spring bracket 42 and the rear spring bracket 44 may be formed in various other configurations within the scope of the present disclosure.

Figure 14:
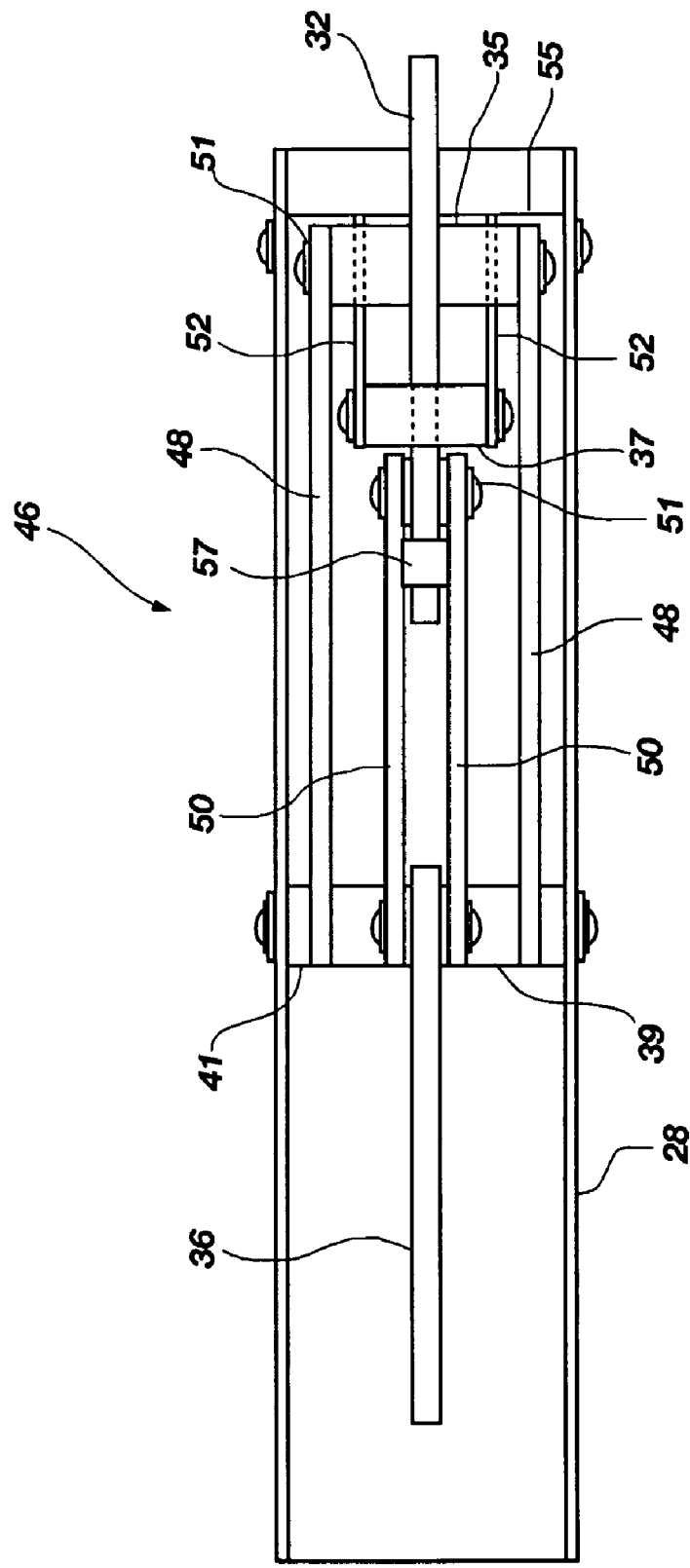
FIG. 14 is a top view of one embodiment of a support base and linkage mechanism for a folding trailer.
Figure 15:
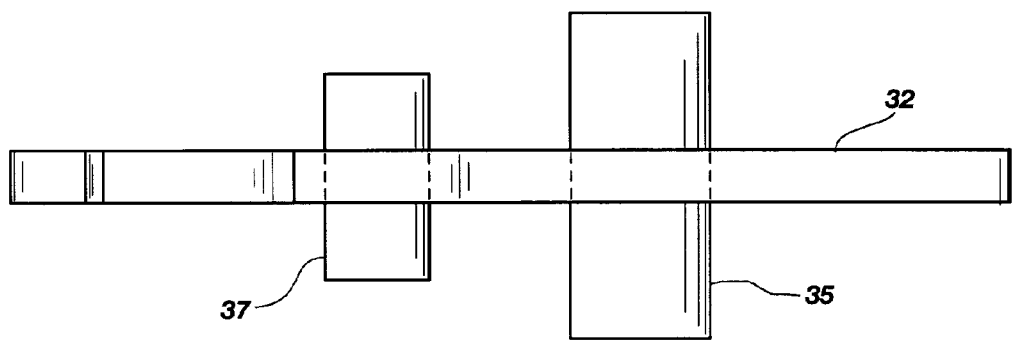
FIG. 15 is a top view of one embodiment of a front brace.
Figure 16:
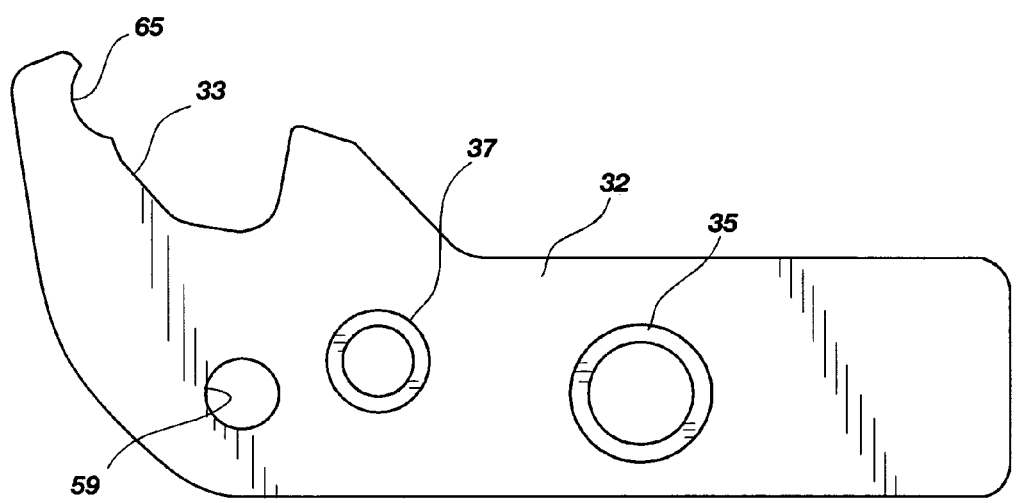
FIG. 16 is a side view of the front brace of FIG. 15.

Referring now to FIG. 14, a top view is shown of one embodiment of a support base 28 and linkage mechanism, indicated generally at 46, of the folding trailer 10. The linkage mechanism 46, may include the front brace 32 disposed on the trailer tongue 12. A top view of one embodiment of the front brace 32 is shown in FIG. 15, and a side view of one embodiment of the front brace 32 is shown in FIG. 16. The front brace 32 may include a hook 33 for receiving the locking bar 34, as shown in FIG. 2, for example. Also, the front brace 32 may include a notch or groove 65 in any suitable configuration for receiving a stop 57 as shown in FIG. 14. Additionally, the front brace 32 may include a first bearing 35 and a second bearing 37 for joining with other components of the linkage mechanism 46. The first bearing 35 and second bearing 37 may be formed as hollow cylindrical members for supporting corresponding linkage members and allowing movement of such corresponding members with respect to the front brace 32. The front brace may also include a connector opening 59 for joining with corresponding linkage members. It will be understood that the configuration, quantity and location of bearing members and connection openings may vary within the scope of the present disclosure. Moreover, the configuration of the front brace 32 may also vary in accordance with the principles of the present disclosure.

Figure 17:
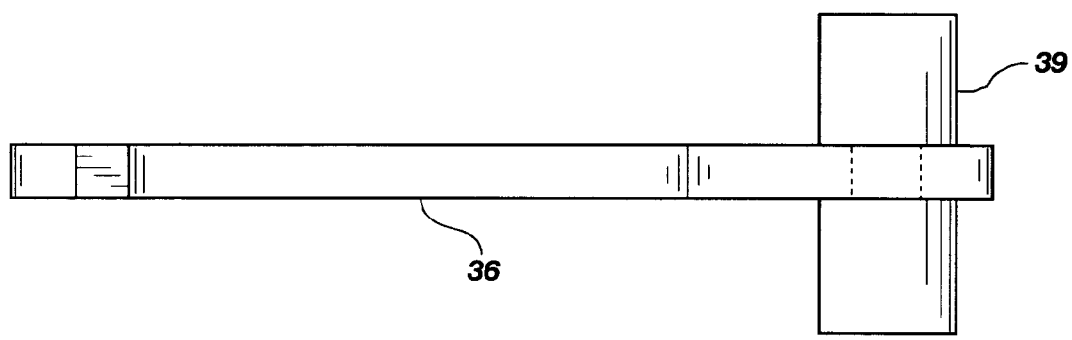
FIG. 17 is a top view of one embodiment of a rear brace.
Figure 18:
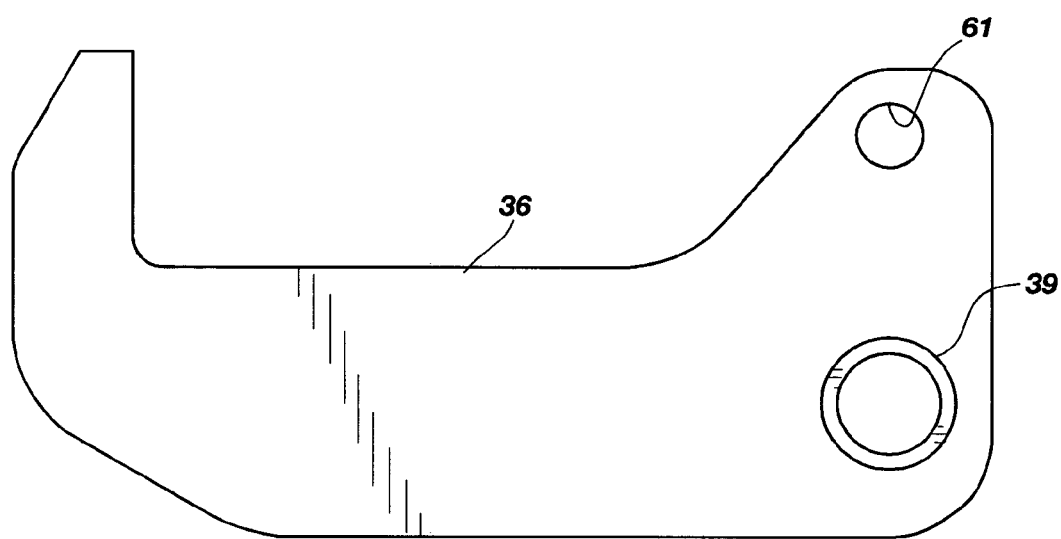
FIG. 18 is a side view of the rear brace of FIG. 17.

The linkage mechanism 46 may also include the rear brace 36. A top view of one embodiment of the rear brace 36 is shown in FIG. 17, and a side view of one embodiment of the rear brace 36 is shown in FIG. 18. The rear brace 36 may be configured for joining with the rear deck 18 and may include a third bearing 39 and a connection opening 61 for joining the rear brace 36 with the other components of the linkage mechanism 46. The third bearing 39 may be configured as a cylindrical member similar to the first bearing 35 and the second bearing 37. It will also be understood that the rear brace 36 may have various different configurations in accordance with the principles of the present disclosure, including bearings of different configurations, quantities and locations.

Figure 19:
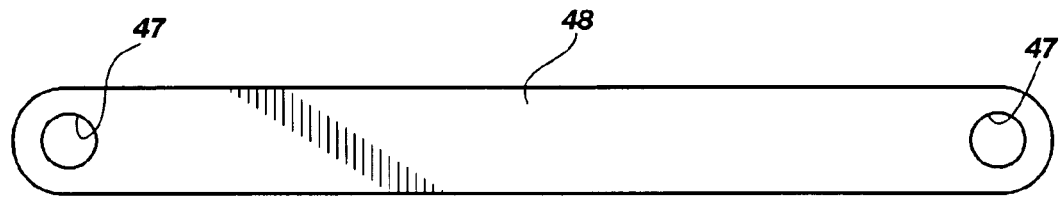
FIG. 19 is a side view of one embodiment of a first link member useful with the linkage mechanism of FIG. 14.

The linkage mechanism 46 may also include a first link member 48 which may be pivotally attached to the first bearing 35 on the front brace 32 and the third bearing 39 on the rear brace 36. A side view of one embodiment of the first link member 48 is shown in FIG. 19. The first link member 48 may be formed as an elongate member having openings 47 on opposing ends. The openings 47 may be configured for receiving bearings or connectors 51 therethrough to allow the first link member 48 to rotate with respect to the first bearing 35 and the third bearing 39. It will be understood that the connectors 51 may be formed as pins or bolts, for example, in various sizes and configurations such that the connectors 51 may be used at various different locations in the linkage mechanism 46, as shown in FIG. 14 and as discussed below. It will also be understood that two first link members 48 may be provided, each on opposite sides of the front brace 32 and the rear brace 36. Similar to the other components of the linkage mechanism, the first link member 48 may have various different configurations.

Figure 20:
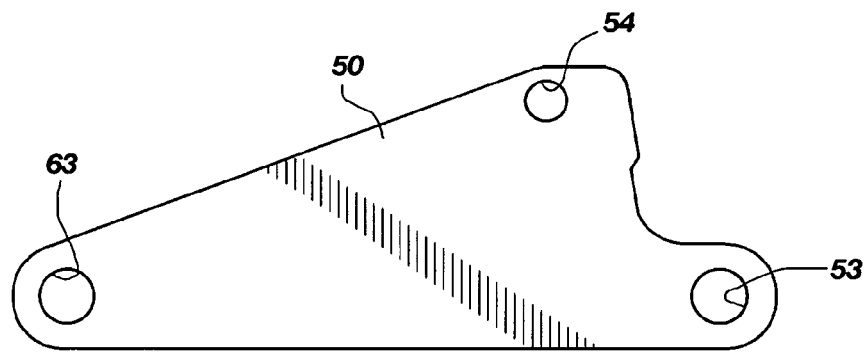
FIG. 20 is a side view of one embodiment of a second link member useful with the linkage mechanism of FIG. 14.

The linkage mechanism 46 may also include a second link member 50, a side view of one embodiment of which is shown most clearly in FIG. 20. The second link member 50 may include a front connection opening 53 and a rear connection opening 63. The second link member 50 may be joined to the front brace 32 by a connector 51 through the front connection opening 53 in the second link member 50 and the connection opening 59 in the front brace 32. The second link member 50 may be joined to the rear brace 36 by a connector 51 through the rear connector opening 63 in the second link member 50 and the connection opening 61 in the rear brace 36. A stop opening 54 may be provided for receiving the stop 57, as shown in FIG. 14, for engaging with the front brace 32 to limit movement of the tongue portion 12 of the trailer 10 with respect to the rear portion 13. It will be understood that two second link member 50 may be provided, each on opposite sides of the front brace 32 and the rear brace 36. Moreover, the shape and configuration of the second link member 50 may vary in accordance with the principles of the present disclosure.

Figure 21:
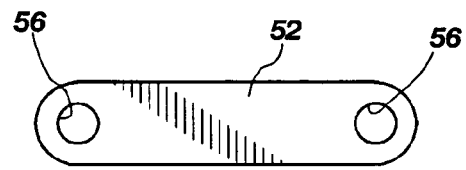
FIG. 21 is a side view of one embodiment of a third link member useful with the linkage mechanism of FIG. 14.

The linkage mechanism 46 may also include a third link member 52. A side view of one embodiment of the third link member 52 is shown in FIG. 21. The third link member 52 may also be pivotally connected to the front brace 32 at the second bearing 37 and the support base 28 at a fifth bearing 55. The third link member 52 may include connection openings 56 on opposing ends for receiving bearings or connectors therethrough to allow the third link member 52 to rotate with respect to the front brace 32 and the support base 28. It will be understood that two third link members 52 may also be provided, one on each opposite sides of the front brace 32. Moreover, the configuration of the third link member 52 may vary in accordance with the principles of the present disclosure.

In one embodiment of the present disclosure, the linkage mechanism 46 may include the first link member 48, the second link member 50 and the third link member 52. Moreover, the linkage mechanism may form a linkage means for connecting the tongue portion 12, the rear portion 13 and at least one support base 28 such that the support base 28 may be movable into position for supporting the front portion 11, including the tongue portion 12, and the rear portion 13 as the trailer 10 is moved to the folded position.

Figure 22:
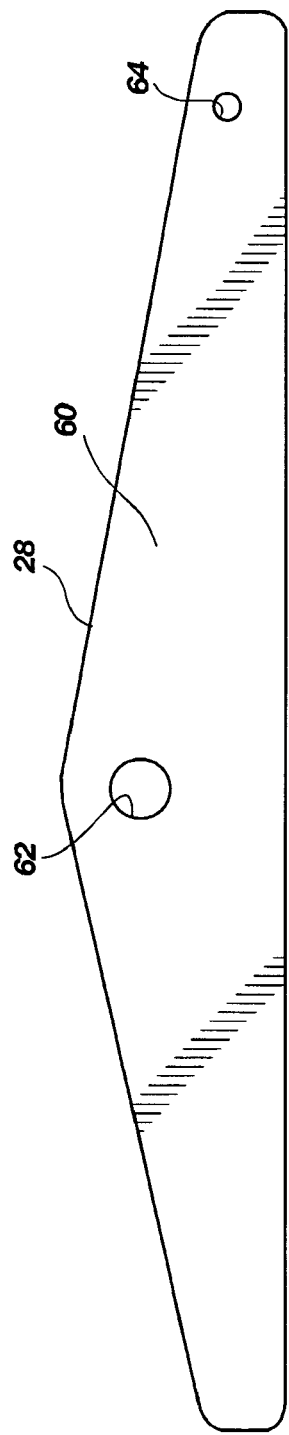
FIG. 22 is a side view of a support base useful with the linkage mechanism of FIG. 14.
Figure 23:
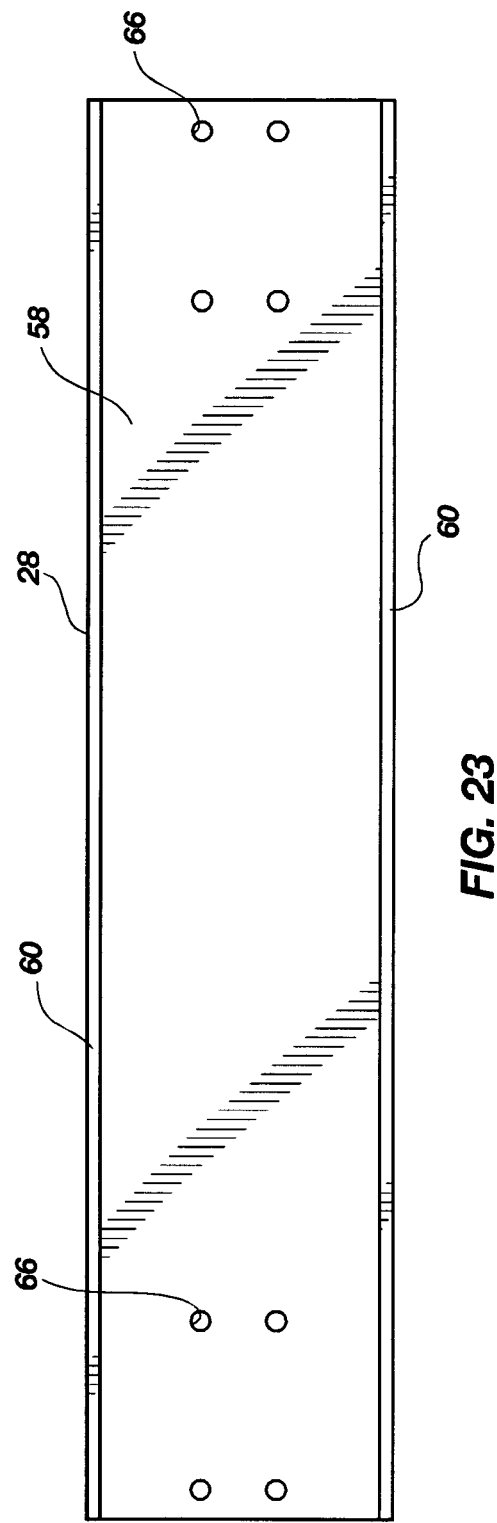
FIG. 23 is a top view of the support base of FIG. 22.

It will be understood that a side view of one embodiment of the support base 28 is shown in FIG. 22, and a top view of one embodiment of the support base 28 is shown in FIG. 23. The support base 28 may include a floor 58 and a pair of sidewalls 60 such that the support base 28 may form a channel for receiving the linkage mechanism 46. Accordingly, the linkage mechanism 46 may be hidden and protected when the trailer 10 is in an open position. The sidewalls 60 of the support base 28 may include a first opening 62 for allowing attachment of the fourth bearing 41, and a second opening 64 for allowing attachment of the fifth bearing 55. It will be understood that any suitable attachment mechanism may be used to attach the bearings and link members to the support base 28 and each other, within the scope of the present disclosure. Accordingly, any variety of hardware such as pins, bolts, bushings, or washers, for example, may be used with the linkage mechanism 46.

Also, the floor 58 of the support base 28 may include one or more roller attachment openings 66. It will be appreciated that the quantity, configuration and location of the roller attachment openings 66 may vary so as to allow attachment of the rollers 30 in a desired configuration. It will be understood that the support base 28 may have various different configurations within the scope of the present disclosure, and in some embodiments, a portion of the linkage mechanism 46 may contact the support surface 31 such that the portion of the linkage mechanism 46 may form the support, base.

Figure 24:
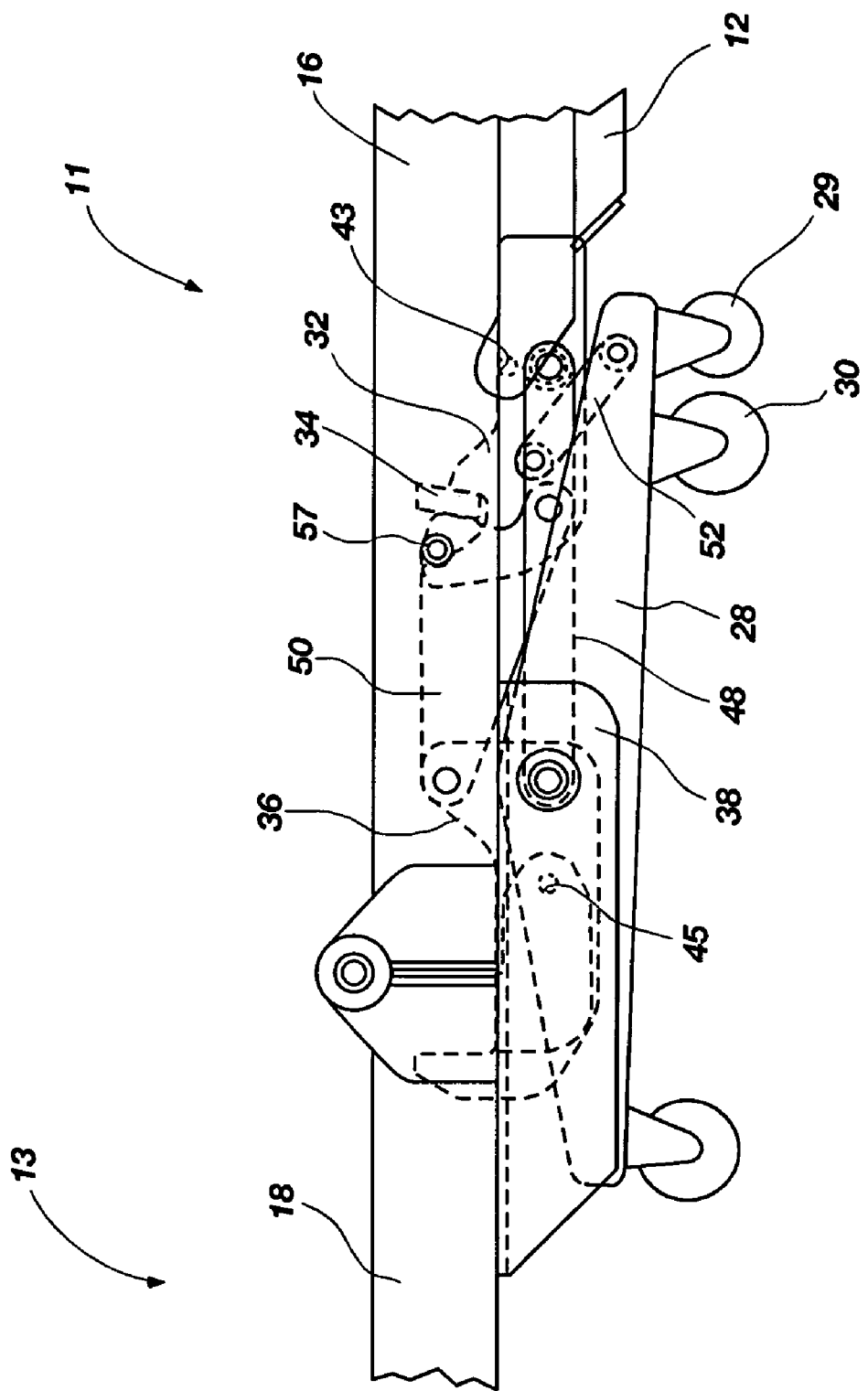
FIG. 24 is a break-away side view of a folding trailer depicting a linkage mechanism with the folding trailer in an open position.
Figure 25:
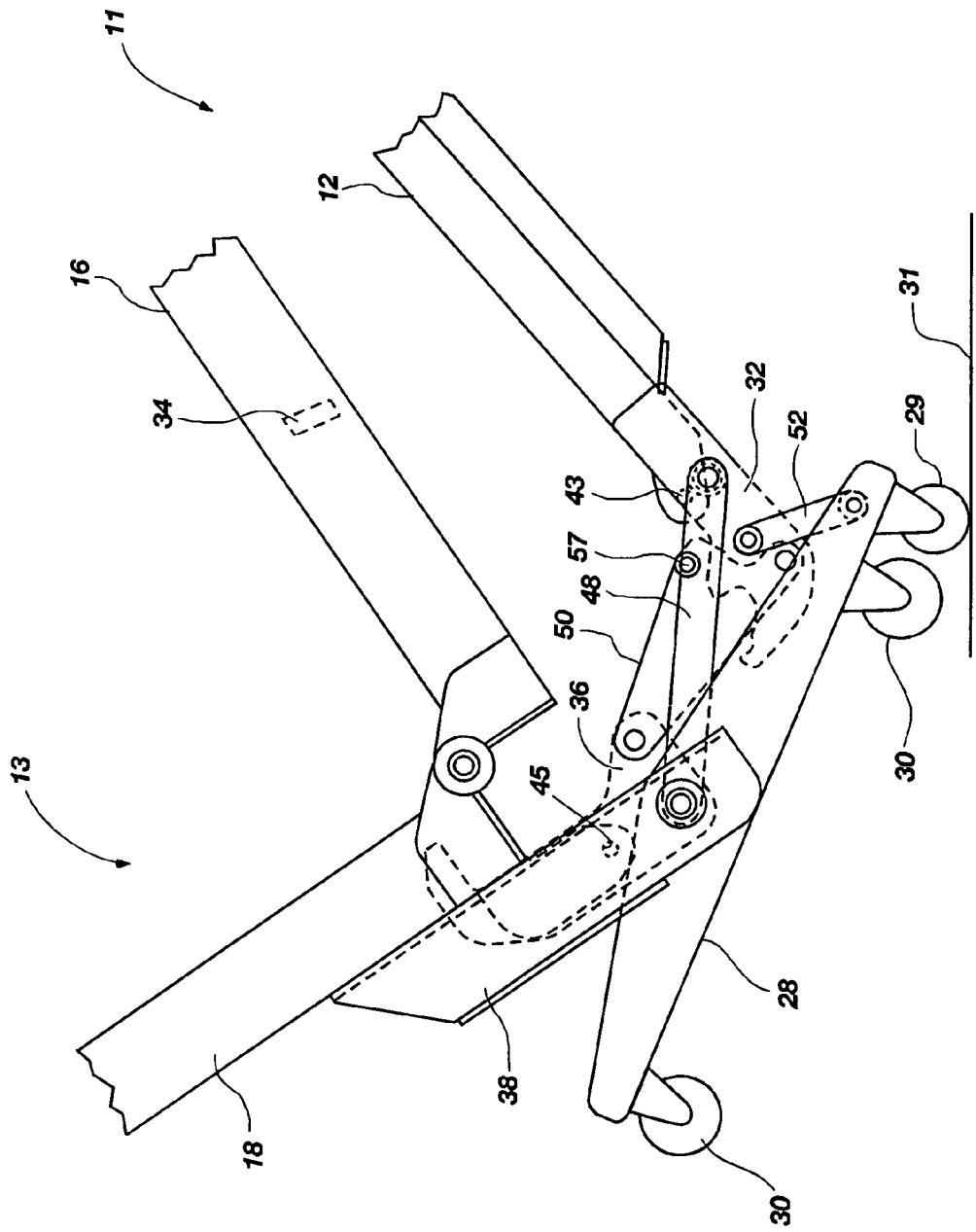
FIG. 25 is a break-away side view of the folding trailer of FIG. 24 depicting the linkage mechanism with the folding trailer in a partially folded position.
Figure 26:
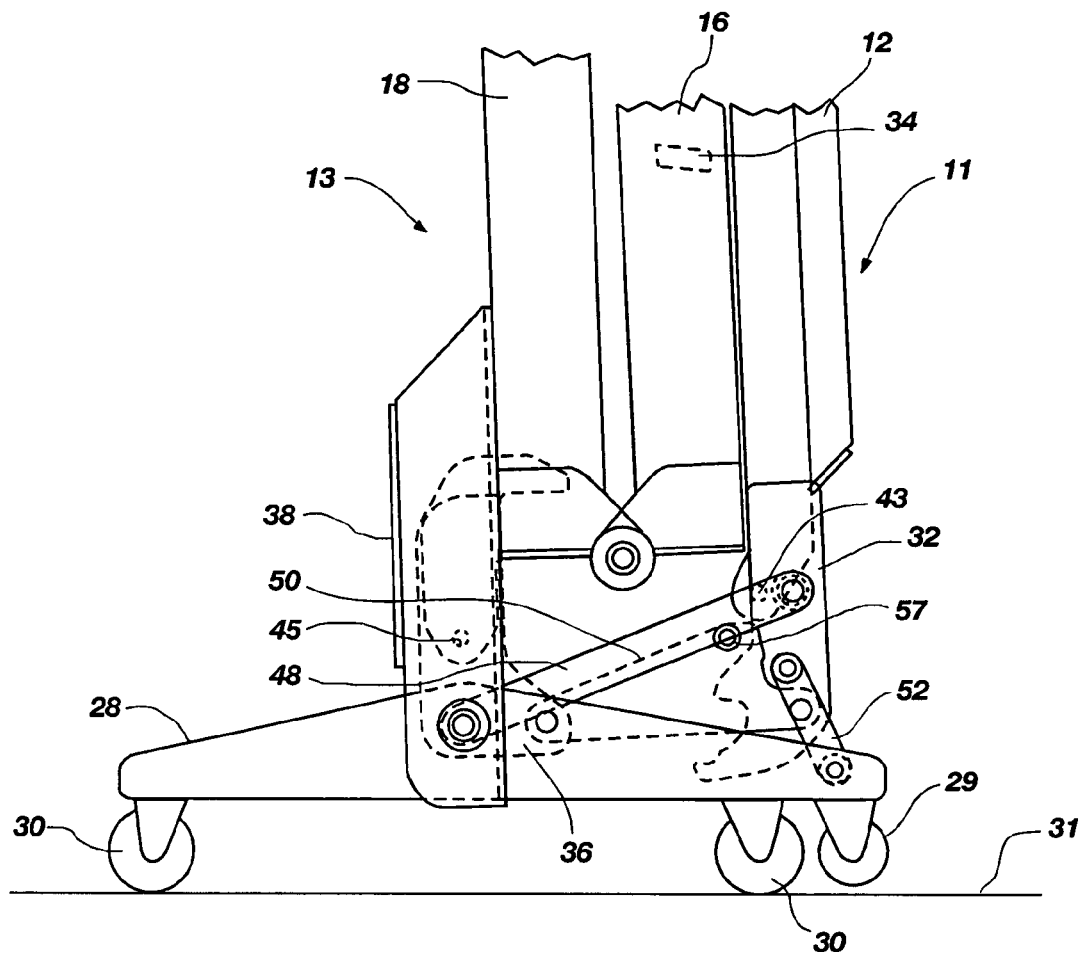
FIG. 26 is a break-away side view of the folding trailer of FIG. 24 depicting the linkage mechanism with the folding trailer in a folded position.

Referring now to FIGS. 24-26, break-away side views are shown of the trailer 10 in progressive steps during the folding process. It will be understood that FIG. 24 includes an enlarged view of the folding mechanism 24 in an open position of the trailer 10 corresponding to FIG. 2. Similarly, FIG. 25 includes an enlarged view of the folding mechanism 24 when the trailer 10 is arranged in a partially folded position corresponding to FIG. 4, and FIG. 26 includes an enlarged view of the folding mechanism 24 when the trailer 10 is arranged in a folded position corresponding to FIG. 5.

It will be noted that as the trailer 10 is released from a tow vehicle and lowered to the support surface 31, as shown in FIG. 3, the front deck 16 may remain joined with the tongue 12, due at least in part to a connection between the front brace 32 and the locking bar or catch 34. The front deck 16 may be lifted to remove the catch 34 from the front brace 32, at which point the rear deck 18 may be allowed to move with respect to the tongue 12, as shown in FIG. 25. Accordingly, one embodiment of the trailer 10 may be configured such that the tongue 12 may be moveably attachable to the rear deck 18 such that movement of the front portion 11 to the folded position may cause the front deck 16 to slide with respect to the tongue 12. The weight of the trailer 10 may cause the trailer 10 to automatically move under the force of gravity to the position of FIG. 25, at which point some of the rollers 30 and or bumpers 29 may contact the support surface 31.

As shown in FIG. 25, the tongue 12 may then be lifted to bring the front deck 16 toward the rear deck 18. The wheels 22 of the trailer 10 and the rollers 30 may facilitate convergence of the front deck 16 and the rear deck 18 as shown in FIG. 25, such that little force may be required to perform the folding of the trailer 10. As shown in FIG. 26, the front deck 16 may be joined with the rear deck 18 and the wheels 22 of the trailer 10 may be lifted off the support surface 31 (see FIG. 5) and the entire trailer 10 may be supported by the rollers 30. The trailer 10 may be maintained in the folded configuration by the securing member 21 or any other variety of attaching mechanisms, such as pins or straps. It will be understood that the trailer 10 may be easily manipulated once in the folded configuration to move the trailer 10 to a desired location.

An optional feature that may be provided in one embodiment of the present disclosure is a fastening device 70, as shown in FIG. 1. The fastening device 70 may be utilized to secure the front portion 11 of the trailer 10 to the rear portion 13 when the trailer 10 is in the open position. Moreover, the fastening device 70 may provide additional support to the front portion 11 of the trailer 10. The fastening device 70 may include a fastening member, such as a rod, bar, pin, plate, bolt, bullet shaped member, or any other such member that may be joined to the front portion 11 of the trailer 10 and may be movable into engagement with the rear portion 13 of the trailer 10. One embodiment of the fastening device 70 may include a cavity formed in the rear deck support 38. The fastening device 70 may include any suitable moving mechanism for moving the fastening member into engagement with the rear portion 13 of the trailer 10 through the cavity in the rear deck support 38. For example, the fastening device 70 may include a rotational threaded movement mechanism, a lever actuated mechanism, or any other suitable movement mechanism known to those skilled in the art for moving the fastening member into and out of engagement with the rear portion 13 of the trailer 10. It will be understood that the fastening device 70 may provide added security to maintain the trailer 10 in the open position, though some embodiments of the trailer 10 may be provided without the fastening device 70.

It will be appreciated by inspection of FIGS. 24 and 26 that one embodiment of the present disclosure may include at least one support base 28 that may be joined to the front portion 11 and the rear portion 13 such that the support base 28 may be oriented substantially parallel to the front deck 16 and rear 18 deck when the trailer 10 is in the open position, and wherein the support base 28 may be oriented substantially perpendicular to the front deck 16 and the rear deck 18 when the trailer 10 is in the folded position.

It will be understood that the components of the trailer 10 may be formed of any suitable material known to those skilled in the art. Moreover, the trailer 10 may be manufactured using any suitable manufacturing process known to those skilled in the art.

It will be appreciated that the structure and apparatus disclosed herein is merely one example of a linkage means for connecting the front portion, the rear portion and the at least one support base such that the at least one support base is movable into position for supporting the front portion and the rear portion as the trailer is moved to the folded position. It should be appreciated that any structure, apparatus or system for connecting which performs functions the same as, or equivalent to, those disclosed herein are intended to fall within the scope of a linkage means for connecting, including those structures, apparatus or systems for connecting which are presently known, or which may become available in the future. Anything which functions the same as, or equivalently to, a linkage means for connecting falls within the scope of this element.

In accordance with the features and combinations described above, a useful method of folding a trailer includes the steps of:

(a) joining a front portion of the trailer and a rear portion of the trailer to at least one support base through a linkage mechanism;

(b) folding the front portion of the trailer with respect to the rear portion of the trailer to thereby position the at least one support base under the trailer for supporting the trailer in a folded position.

Those having ordinary skill in the relevant art will appreciate the advantages provide by the features of the present disclosure. For example, it is a feature of the present disclosure to provide a folding trailer that is relatively simple in design and manufacture. It is a further feature of the present disclosure, in accordance with one aspect thereof, to provide a folding trailer that can be easily folded from a usable open configuration to a folded configuration. Another feature of the present disclosure is to provide such a folding trailer that can be easily manipulated when in the folded position. It is another feature of the present disclosure to provide a folding trailer that can be folded to a position in which the trailer wheels are elevated off a support surface such as the ground. It is a further feature of the present disclosure to provide a folding trailer having a folding mechanism that may be non-obtrusive and hidden from view when the trailer is in the open position. It is an additional feature of the present disclosure to provide a folding trailer that is versatile and aesthetically pleasant in appearance.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A folding trailer comprising:
   a front portion for attaching to a tow vehicle;
   a rear portion being rotatable with respect to said front portion such that said front portion and said rear portion are foldable together to a folded position; and
   a support base for supporting said front portion and said rear portion when said front portion and rear portion are in said folded position;
   wherein said front portion and said rear portion are rotatably joined by a linking mechanism to said support base; and
   wherein said support base acts as a link in said linking mechanism.

2. The folding trailer of claim 1, wherein said front portion comprises a tongue and a front deck.

3. The folding trailer of claim 2, wherein said tongue is moveably attachable to said front deck such that movement of said front portion to said folded position causes said front deck to slide with respect to said tongue.

4. The folding trailer of claim 2, wherein said rear portion comprises a rear deck, and wherein said rear deck is rotatably joined to said front deck.

5. The folding trailer of claim 2, further comprising a securing member for securing said front deck with said tongue.

6. The folding trailer of claim 2, further comprising a front brace disposed on said tongue, said front brace comprising a hook for engaging a catch on said front deck for holding said front deck in position with respect to said tongue.

7. The folding trailer of claim 1, wherein said at least one support base comprises two support bases, and wherein said support bases are disposed on opposite sides of said trailer.

8. The folding trailer of claim 1, wherein said at least one support base comprises a plurality of rollers.

9. The folding trailer of claim 1, further comprising a first link member rotatably connecting said front portion to said rear portion and said at least one support base.

10. The folding trailer of claim 9, further comprising a second link member rotatably connecting said rear portion to said front portion.

11. The folding trailer of claim 9, further comprising a third link member rotatably connecting said front portion to said at least one support base.

12. The folding trailer of claim 1, wherein said at least one support base is joined to said front portion and said rear portion such that said at least one support base is oriented substantially parallel to a front deck and a rear deck when said trailer is in said open position, and wherein said at least one support base is oriented substantially perpendicular to said front deck and said rear deck when said trailer is in said folded position.

13. The folding trailer of claim 1, wherein said front portion comprises a tongue and a front deck;

wherein said tongue is moveably attachable to said front deck such that movement of said front portion to said folded position causes said front deck to slide with respect to said tongue;

further comprising a front brace disposed on said tongue, said front brace comprising a hook for engaging a catch on said front deck for holding said front deck in position with respect to said tongue;

further comprising a securing member for securing said front deck with said tongue;

wherein said rear portion comprises a rear deck, and further comprising a rear brace disposed on said rear deck, and wherein said rear deck is rotatably joined to said front deck;

wherein said at least one support base comprises a plurality of rollers;

further comprising a pair of first link members rotatably connecting said front portion to said rear portion and said at least one support base, each of said first link members being disposed on an opposite side of said front brace;

further comprising a pair of second link members rotatably connecting said rear portion to said front portion, each of said second link members being disposed on an opposite side of said front brace;

further comprising a pair of third link members rotatably connecting said front portion to said at least one support base, each of said third link members being disposed on an opposite side of said front brace;

wherein said at least one support base comprises two support bases, and wherein said support bases are disposed on opposite sides of said trailer.

14. A folding trailer comprising:
a front portion;
a rear portion configured to fold with said front portion from an open position to a folded position;
a support base positionable for supporting said front portion and said rear portion when said trailer is in said folded position; and
a linkage means for connecting said front portion, said rear portion and said support base such that said support base is movable into position for supporting said front portion and said rear portion as said trailer is moved to said folded position; and
wherein said support base acts as a link in said linkage means.

15. The folding trailer of claim 14, wherein said linkage means comprises a first link member rotatably connecting said front portion to said rear portion and said at least one support base.

16. The folding trailer of claim 15, wherein said linkage means comprises a second link member rotatably connecting said rear portion to said front portion.

17. The folding trailer of claim 16, wherein said linkage means comprises a third link member rotatably connecting said front portion to said at least one support base.

18. The folding trailer of claim 14, wherein said rear portion comprises at least one wheel for supporting said rear portion on said support surface when the trailer is in said open position.

19. The folding trailer of claim 14, wherein said front portion comprises a tongue and a front deck, wherein said tongue is moveably attachable to said front deck such that movement of said front portion to said folded position causes said front deck to slide with respect to said tongue.

20. The folding trailer of claim 19, further comprising a front brace disposed on said tongue, said front brace comprising a hook for engaging a catch on said front deck for holding said front deck in position with respect to said tongue.

21. The folding trailer of claim 19, wherein said rear portion comprises a rear deck, and wherein said rear deck is rotatably joined to said front deck.

22. The folding trailer of claim 14, wherein said at least one support base comprises two support bases, and wherein said support bases are disposed on opposite sides of said trailer.

23. A folding trailer comprising:
a front portion comprising a front deck and a tongue, said tongue being configured for attaching to a tow vehicle;
a rear portion comprising a rear deck, said rear deck being rotatably attached to said front deck such that said front portion and said rear portion are foldable together to a folded position;
wherein said tongue rotates about a different axis than the axis about which the deck rotates.

24. The folding trailer of claim 23, further comprising at least one support base for supporting said front portion and said rear portion on a support surface when said front portion and said rear portion are in said folded position.

25. The folding trailer of claim 24, further comprising linkage means for connecting said front portion, said rear portion and said at least one support base such that said at least one support base is movable into position for supporting said front portion and said rear portion as said trailer is moved to said folded position.

26. The folding trailer of claim 23, wherein said rear portion comprises at least one wheel for supporting said rear portion on a support surface when the trailer is in an open position.

27. The folding trailer of claim 23, further comprising a securing member for securing said front deck with said tongue.

28. The folding trailer of claim 23, further comprising a front brace disposed on said tongue, said front brace comprising a hook for engaging a catch on said front deck for holding said front deck in position with respect to said tongue.

29. A method of using a folding trailer comprising:
moving a front portion about an axis;
moving a rear portion attached to said front portion such that said front portion and said rear portion fold together from an open position to a folded position
thereby causing a support base for supporting said front portion and said rear portion in said folded position to move into a working position wherein said front portion is attached to said support base through a first link member and said rear portion is attached to said front portion through a second link member such that said at least one support base is movable with respect to said front portion and said rear portion.

30. The method of claim 29, further comprising a moving a third link member rotatably connecting said front portion to said at least one support base.

31. The method of claim 29, wherein said rear portion comprises at least one wheel for supporting said rear portion on a support surface when the trailer is in said open position.

32. The method of claim 29, wherein said front portion comprises a tongue and a front deck, wherein said tongue is moveably attachable to said front deck such that movement of said front portion to said folded position causes said front deck to slide with respect to said tongue.

33. The method of claim 32, wherein said rear portion comprises a rear deck, and wherein said rear deck is rotated relative to said front deck.

34. The method of claim 29, wherein said at least one support base comprises two support bases, and wherein said support bases are disposed on opposite sides of said trailer.

35. A folding trailer comprising:
- a front portion comprising a front deck;
- a rear portion comprising a rear deck, said rear deck rotatably joined with said front deck such that said front portion and said rear portion are foldable together from an open position to a folded position; and
- at least one support base for supporting said front portion and said rear portion on a support surface when said trailer is in said folded position;
- wherein said at least one support base is joined to said front portion and said rear portion such that said at least one support base is configured to be oriented substantially parallel to said front deck and said rear deck when said trailer is in said open position, and wherein said at least one support base is configured to be oriented substantially perpendicular to said front deck and said rear deck when said trailer is in said folded position.

36. The folding trailer of claim 35, wherein said front portion comprises a tongue wherein said tongue is moveably attachable to said front deck such that movement of said front portion to said folded position causes said front deck to slide with respect to said tongue.

37. The folding trailer of claim 35, further comprising a first link member rotatably connecting said front portion to said rear portion and said at least one support base.

38. The folding trailer of claim 37, further comprising a second link member rotatably connecting said rear portion to said front portion.

39. The folding trailer of claim 38, further comprising a third link member rotatably connecting said front portion to said at least one support base.

40. The folding trailer of claim 35, wherein said rear portion comprises at least one wheel for supporting said rear portion on said support surface when the trailer is in said open position.

* * * * *